(12) United States Patent
Kawai et al.

(10) Patent No.: US 10,900,595 B2
(45) Date of Patent: Jan. 26, 2021

(54) THREADED JOINT FOR OIL WELL TUBING

(71) Applicant: JFE Steel Corporation, Tokyo (JP)

(72) Inventors: Takamasa Kawai, Tokyo (JP); Taro Kanayama, Tokyo (JP); Masaki Yoshikawa, Tokyo (JP); Haruhiko Seki, Tokyo (JP); Masateru Ueta, Tokyo (JP); Jun Takano, Tokyo (JP); Tsuyoshi Yoneyama, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 277 days.

(21) Appl. No.: 16/077,912

(22) PCT Filed: Dec. 16, 2016

(86) PCT No.: PCT/JP2016/087462
§ 371 (c)(1),
(2) Date: Aug. 14, 2018

(87) PCT Pub. No.: WO2017/141538
PCT Pub. Date: Aug. 24, 2017

(65) Prior Publication Data
US 2019/0056049 A1 Feb. 21, 2019

(30) Foreign Application Priority Data
Feb. 19, 2016 (JP) ................................ 2016-029653

(51) Int. Cl.
*F16L 15/04* (2006.01)
*E21B 17/042* (2006.01)

(52) U.S. Cl.
CPC ............ *F16L 15/04* (2013.01); *E21B 17/042* (2013.01)

(58) Field of Classification Search
CPC .............................. F16L 15/04; E21B 17/042
See application file for complete search history.

(56) References Cited

U.S. PATENT DOCUMENTS

| 6,851,727 B2 | 2/2005 | Carcagno et al. |
| 2004/0108719 A1 | 6/2004 | Carcagno et al. |

(Continued)

FOREIGN PATENT DOCUMENTS

| EP | 2998633 A1 | 3/2016 |
| JP | 2006506582 A | 2/2006 |

(Continued)

OTHER PUBLICATIONS

International Search Report and Written Opinion for International Application No. PCT/JP2016/087462, dated Mar. 14, 2017—6 pages.

(Continued)

*Primary Examiner* — James M Hewitt, II
(74) *Attorney, Agent, or Firm* — RatnerPrestia

(57) ABSTRACT

Provided is a threaded joint for an oil well tubing which possesses sufficient sealability when the external pressure is applied to the threaded joint by suppressing the plastic deformation of a nose portion and sufficient galling resistance. The sufficient galling resistance is provided by preventing the occurrence of galling at the time of making up the threaded joint during verification test performed in accordance with ISO13679:2002 even when the threaded joint for an oil well tubing has a small thickness. Parameters including sizes of the threaded joint at positions of a seal point and shoulder portions satisfy formula 1 $((Ds1^2-Ds0^2)/(D1^2-D0^2) \geq 0.30)$, formula 2 $(\tan \theta > (\Delta D + \delta)/\{2(Lt-Ls)\})$, and $Ls/Ln$ is set to 0.2 to 0.6.

1 Claim, 3 Drawing Sheets

(56) References Cited

U.S. PATENT DOCUMENTS

| | | | |
|---|---|---|---|
| 2005/0248153 A1* | 11/2005 | Sugino | F16L 15/004 |
| | | | 285/333 |
| 2011/0241340 A1* | 10/2011 | Okada | E21B 17/042 |
| | | | 285/333 |
| 2013/0181442 A1* | 7/2013 | Sonobe | F16L 15/06 |
| | | | 285/333 |
| 2014/0116560 A1* | 5/2014 | Kawai | F16L 15/00 |
| | | | 138/109 |
| 2015/0316181 A1 | 11/2015 | Tejeda et al. | |

FOREIGN PATENT DOCUMENTS

| | | |
|---|---|---|
| JP | 4257707 B2 | 4/2009 |
| WO | 2012002409 A1 | 1/2012 |
| WO | 2012056500 A1 | 5/2012 |
| WO | 2012118167 A1 | 9/2012 |
| WO | 2015015799 A1 | 2/2015 |

OTHER PUBLICATIONS

Extended European Search Report for European Application No. 16 890 675.8, dated Feb. 14, 2019, 6 pages.

* cited by examiner

THREADED JOINT FOR OIL WELL TUBING

CROSS REFERENCE TO RELATED APPLICATIONS

This is the U.S. National Phase application of PCT/JP2016/087462, filed Dec. 16, 2016, which claims priority to Japanese Patent Application No. 2016-029653, filed Feb. 19, 2016, the disclosures of these applications being incorporated herein by reference in their entireties for all purposes.

TECHNICAL FIELD OF THE INVENTION

The present invention relates to a threaded joint for an oil well pipe generally used for search and production of oil well or gas well and more particularly to a threaded joint for an oil well pipe preferably applied to tubing.

BACKGROUND OF THE INVENTION

Threaded joints have been popularly used for connecting steel pipes used in installations of an oil industry such as oil well tubing. Recently, deepening of a well for crude oil or a natural gas has been in progress and the number of horizontal wells and directional wells from vertical wells has been increasing and hence, the drilling and production environment has become severe. Further, the number of wells developed in an extremely appalling circumstance such as oceans and polar regions has been increasing and hence, the performances which threaded joints are required to satisfy are diversified including compression resistance, bending resistance, sealability against an external pressure (external pressure resistance), or the like. In connecting steel pipes used for search and production of oil or gas, conventionally, a standard threaded joint which is stipulated in API (American Petroleum Institute) standard has been typically used. However, the above-mentioned diversification of required performances has made the number of cases of using a special threaded joint having high performances which is referred to as "premium joint" increase and a demand for the improvement in performance of the premium joint also steadily increase.

A premium joint is usually a joint which includes: tapered threads; seal portions (to be more specific, metal touch seal portions); and shoulder portions (to be more specific, torque shoulder portions). That is, the premium joint is a coupling-type joint of joining male threaded members formed on tube end portions (hereinafter referred to as "pin") and a female threaded member for connecting with one pin to connect two pins each other (hereinafter referred to as "box"). The tapered threads are important for firmly fixing the joint. Bringing the box and the pins into metal contact each other forms the seal portions therebetween and the seal portions plays a role of ensuring sealability. The shoulder portions form shoulder faces which function as stoppers during making up the joint.

Further, the above-mentioned deepening of a well increases the number of cases which requires an oil well tubing capable of coping with a high-temperature high-pressure environment. In designing wells, a tendency is observed where an outer diameter of a tubing for sucking a production fluid (crude oil, a natural gas or the like) is small and, for the enhancement of productivity, a wall thickness of the tubing is decreased so as to increase a cross-sectional area of an inner diameter of the tubing through which a fluid passes.

Under such circumstances, there have been conventionally proposed several techniques so as to satisfy a demand for a threaded joint which possesses high resistance and sealability even under a large compressive load. For example, there has been known a technique where a ratio of a cross-sectional area of a contact surface of a shoulder portion on a box side (an area of a region obtained by orthogonal projection of the contact surface on a surface orthogonal to a tubing axis) to a pin-raw-tube cross-sectional area (a cross sectional area of a pin non-formed portion of a steel pipe which is formed by applying pin forming to an end portion of the steel pipe) is set to a predetermined value (0.5) or more (see PTL 1).

PTL 1: Japanese Patent No. 4257707

SUMMARY OF THE INVENTION

A value calculated based on a mathematical expression stipulated in API 5C3 is used as an external pressure in a test for evaluating sealability of a threaded joint required for ISO13679:2002. In the test, in case of a tubing formed of a pin having an outer diameter of 114.3 mm (4.5 inches or 4.5") or less, WT/OD which is a ratio between a wall thickness (WT) and an outer diameter (OD) becomes relatively large. Accordingly, such tubing is required to possess sealability at an external pressure higher than an external pressure which a tubing formed of a pin having an outer diameter larger than 114.3 mm is required to possess.

On the other hand, the tubing has a small wall thickness in general and hence, a wall thickness of a nose portion becomes small whereby there is a tendency that a cross-sectional area of a shoulder portion (the area of the region obtained by orthogonal projection of the contact surface on a surface orthogonal to a tubing central axis) also becomes small. This tendency is liable to cause a problem in the form of plastic deformation of the nose portion at the time of making up a threaded joint. It is difficult to solve this problem with the technique disclosed in PTL 1. Further, such a conventional technique is not still sufficient from viewpoint of prevention of the occurrence of so-called "galling" which is seizing caused at the time of making up the threaded joint or at the time of breaking out the joint.

The present invention has been made in view of the above-mentioned circumstances, and it is an object of an aspect of the present invention to provide a threaded joint for an oil well tubing which possesses, even in the case where the threaded joint for an oil well tubing is a threaded joint for a tubing having a small wall thickness, sufficient sealability (sufficient sealability against an external pressure) when the external pressure is applied to the threaded joint by suppressing the plastic deformation of a nose portion in a sealability test and sufficient galling resistance at the time of making up and breaking out the threaded joint in the test performed in accordance with ISO13679:2002.

The inventors of the present invention have made extensive studies to solve the above-mentioned problem, and have made the present invention having the following configuration as the gist of an aspect of the present invention.

[1] A threaded joint for an oil well tubing including:

a pin having a nose portion on a distal end of a male threaded portion; and a box having a female threaded portion which engages with the male threaded portion of the pin by fitting engagement and portions opposedly facing the nose portion, wherein a shoulder portion positioned on a distal end of the nose portion of the pin is brought into contact with a shoulder portion of the box which opposedly faces the shoulder portion of the pin in an axial direction, an outer surface of the nose portion of the pin is formed of a projecting curved surface, and an inner surface of the box which opposedly faces the outer surface of the nose portion is formed of a tapered surface having an inclination angle θ with respect to the axial direction, both the outer surface of the nose portion of the pin and the inner surface of the box are configured to be brought into metal-to-metal contact with each other in a radial direction at the time of making up the joint thus forming a structure which seals a fluid, a seal point is defined as a position in the axial direction where an overlapping margin of seal portions of both the pin and the box in the radial direction becomes maximum in a state where cross sectional views in the axial direction of both the pin and the box are made to overlap with each other such that the shoulder portions mate with each other, and following parameters including sizes of the threaded joint at the seal point and the shoulder portions satisfy following formulae 1, 2 and Ls/Ln is set to 0.2 to 0.6:

$$(Ds1^2-Ds0^2)/(D1^2-D0^2) \geq 0.30 \quad \text{(formula 1)}$$

$$\tan\theta > (\Delta D+\delta)/\{2(Lt-Ls)\} \quad \text{(formula 2)}$$

where

Ds1: diameter (inch) expressing position of upper end of a shoulder contact surface;

Ds0: diameter (inch) expressing position of lower end of the shoulder contact surface;

D1: outer diameter (inch) of a pin non-formed portion;

D0: inner diameter (inch) of the pin non-formed portion;

θ: taper angle (°) of the seal portion of the box;

ΔD: difference (ΔD=Dn−Dsp) (inch) between outer diameter Dn (inch) of connecting portion of the nose portion with the threaded portion of the pin and outer diameter Dsp (inch) at the position of the seal point;

δ: seal interference amount (overlapping margin of the seal portions per diameter at the position of the seal point) (inch);

Lt: index (inch) of finish position of a seal taper portion of the box (expressed by length from a distal end of the pin in axial direction);

Ls: index (inch) of a seal point position (which is expressed by length from the distal end of the pin in axial direction); and Ln: length (inch) of the nose portion.

[2] The threaded joint for an oil well tubing described in the above-mentioned [1] where the outer diameter of the pin is set to 114.3 mm or less and the Ln is set to 5.08 mm or more.

According to the present invention, even when the threaded joint for an oil well tubing is formed of a threaded joint for a tubing having a small wall thickness, it is possible to prevent the occurrence of galling at the time of making up and breaking out the joint in the test performed in accordance with ISO13679: 2002. Further, in a sealability test, plastic deformation of the nose portion can be suppressed thus realizing sufficient sealability (sufficient sealability against an external pressure) when the external pressure is applied to the threaded joint.

DETAILED DESCRIPTION OF EMBODIMENTS OF THE INVENTION

Hereinafter, embodiments of the present invention are described with reference to FIG. 1 to FIG. 3 firstly. Next, technical features of embodiments of the present invention are described in more detail with reference to FIG. 4.

Figure 1:
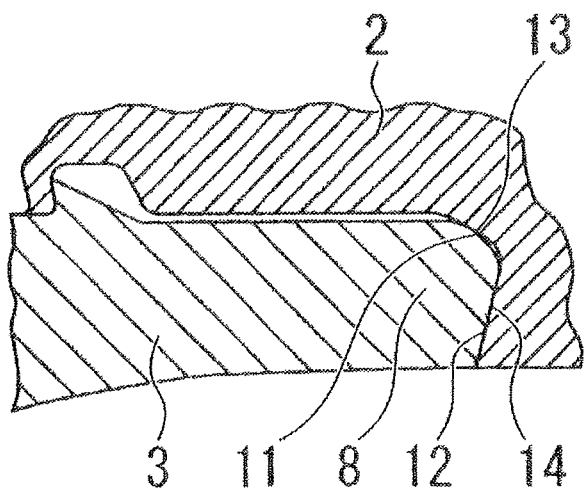
FIG. 1 is a schematic explanatory view showing a premium joint for an oil well tubing which forms a technique relating to a threaded joint for an oil well tubing according to an embodiment of the present invention, and is also a schematic view of a nose portion.
Figure 2:
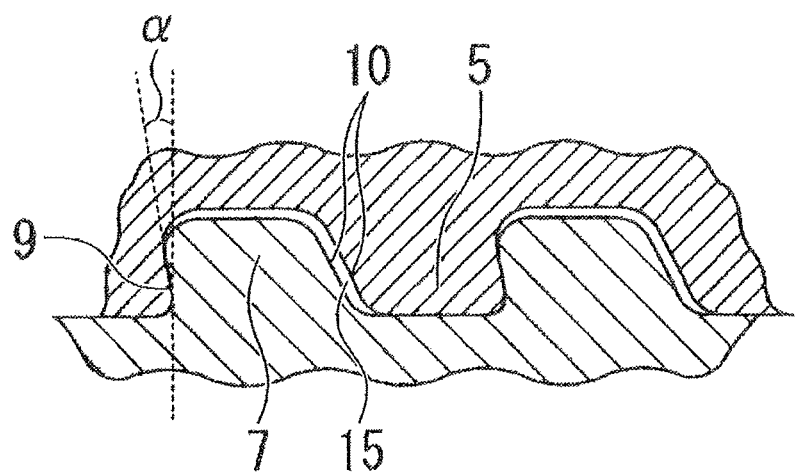
FIG. 2 is a schematic explanatory view showing the premium joint for an oil well tubing which forms the technique relating to the threaded joint for an oil well tubing according to an embodiment of the present invention, and is also a schematic view of threaded portions.
Figure 3:
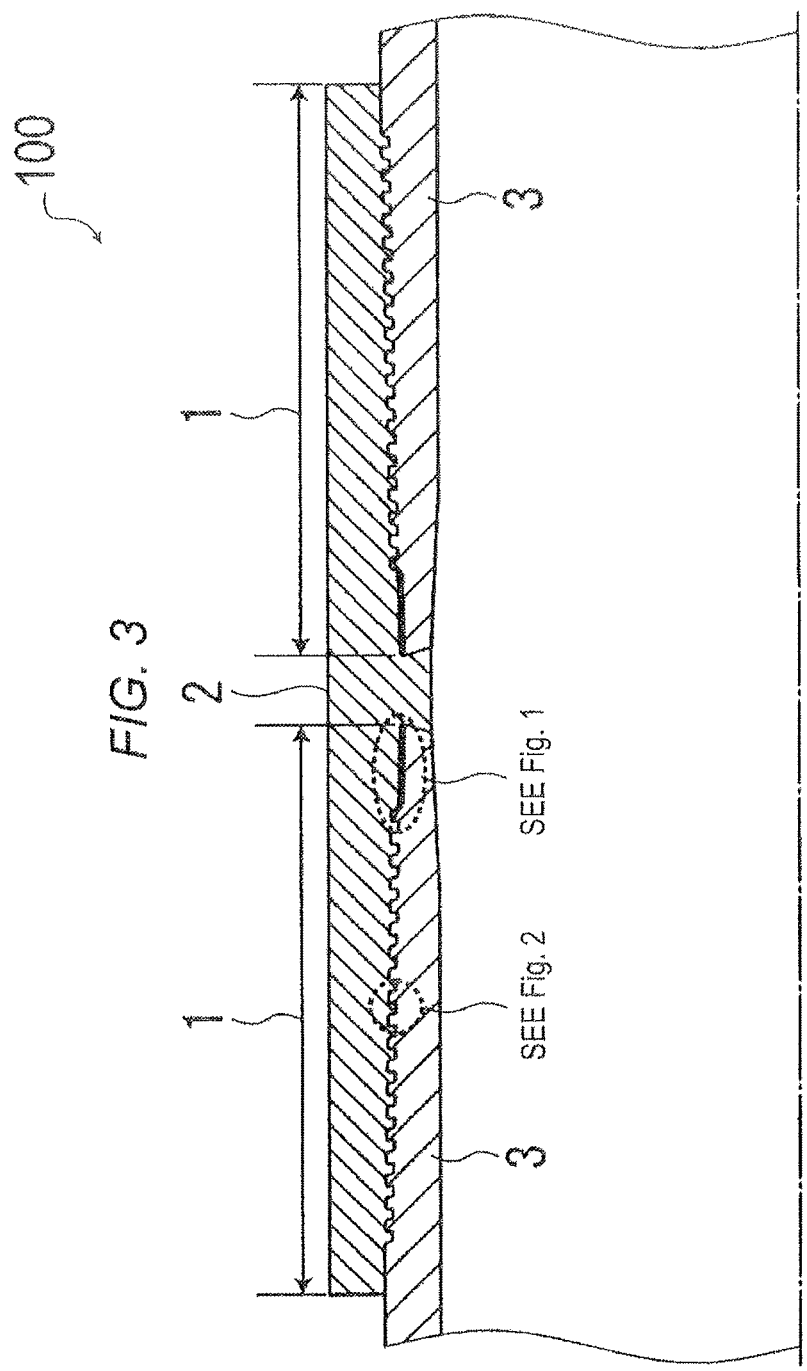
FIG. 3 is a schematic explanatory view showing the premium joint for an oil well tubing which forms the technique relating to the threaded joint for an oil well tubing according to an embodiment of the present invention, and is also a schematic view of the entire joint portion.

FIG. 1 to FIG. 3 are schematic explanatory views showing a premium joint for an oil well tubing which forms a technique relating to a threaded joint for an oil well tubing according to aspects of the present invention. These explanatory views are longitudinal cross-sectional views (cross-sectional views where a tubing axis extends within a cross section) of threaded joint formed of a circular tube. The threaded joint 100 includes pins 3 and a box 2 which corresponds to these pins 3. The pin 3 has a male threaded portion 7 on outer surface thereof, and a nose portion (also referred to as a pin nose) 8 which is a portion of a length disposed adjacently to the male threaded portion 7 on a distal end side of the pin 3 and having no threads. The nose portion 8 has a seal portion (to be more specific, a metal touch seal portion) 11 on an outer peripheral surface thereof, and a shoulder portion 12 on an end surface thereof. On an inner surface of the box 2, a female threaded portion 5, a seal portion 13 and a shoulder portion 14 are formed. The female threaded portion 5 is threadedly engaged with the male threaded portion 7 of the pin 3, the seal portion 13 is brought into contact with the seal portion 11 of the pin 3 and the shoulder portion 14 is brought into contact with the shoulder portion 12 of the pin 3.

In the technique relating to the threaded joint for an oil well tubing, the threaded joint is of a type having the seal portion 11 on a distal end portion of the pin 3. A desired seal performance can be realized by applying a proper making up torque to the seal portion 11. However, the making up torque is influenced by a lubrication condition, properties of a surface and the like. As a design which does not largely depend on such a lubrication condition, properties of a surface and the like, there has been known a threaded joint adopting a radial direction seal method which relatively increases a radial directional component of a seal contact pressure (hereinafter referred to as a radial-seal-type threaded joint). The radial-seal-type threaded joint is substantially equal to the threaded joint of a type where the seal portion is formed on the distal end portion of the pin with respect to the point that the seal portion is formed at a position different from a position where the shoulder portion is formed. However, the radial-seal-type threaded joint has an advantage that a seal contact pressure is minimally reduced when a tensile load in an axial direction is applied to the threaded joint.

In FIG. 2, α indicates a load flank angle. The load flank angle α is defined by an angle which a load flank surface 9 of the threaded portion makes with a plane orthogonal to a tubing central axis. When an end of the load flank surface 9 on a pin inner diameter side is positioned more on a pin distal end side than an end of the load flank surface 9 on a pin outer diameter side as shown in FIG. 2, the load flank angle α is expressed as a negative angle (for example, α=−5° or the like). On an opposite case, the load flank angle α is expressed as a positive angle (for example, α=5°). When the load flank angle α is neither a negative angle nor a positive angle, the load flank angle α is set to 0 (α=0°). A thread gap 15 is defined as a distance between a stabbing flank surface 10 on a pin side and a stabbing flank surface 10 on a box side of the threaded portion (distance between stabbing flank surfaces at a center position in a thread height direction) when the load flank surface of the pin and the load flank angle of the box are brought into contact with each other.

Figure 4:
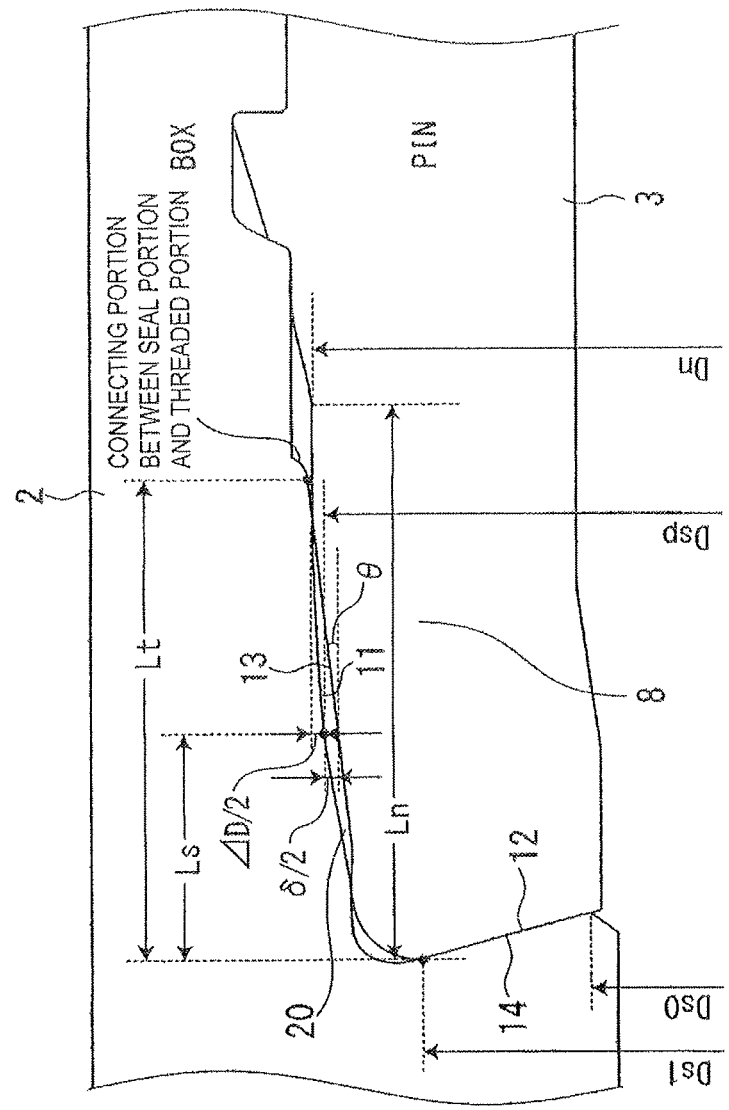
FIG. 4 is a view prepared by filling some parameters used in an embodiment of the present invention in a schematic view of a radial-seal-type threaded joint.

FIG. 4 is a view prepared by filling some parameters used in embodiments of the present invention in a schematic view of a radial-seal-type threaded joint. In FIG. 4, same symbols are given to parts identical with or corresponding to the parts described in FIG. 1 to FIG. 3, and the description of these parts is omitted. The radial-seal-type threaded joint includes: pins 3 having an outer diameter (D1 described later) of 114.3 mm or less where the nose portion is continuously formed on a distal end of the male threaded portion; and the box 2 having the female threaded portions which engage with the male threaded portions of the pins 3 by fitting engagement and portions opposely facing the nose portions 8. The shoulder portion 12 positioned on a distal end of the nose portion 8 of the pin 3 is brought into contact with a shoulder portion 14 of the box 2 which opposedly faces the shoulder portion 12 of the pin 3 in an axial direction. An outer surface of the nose portion 8 of the pin 3 is formed of a projecting curved surface, and an inner surface of the box 2 which opposedly faces the outer surface of the nose portion 8 is formed of a tapered surface having an inclination angle (taper angle) θ with respect to the axial direction. Both the outer surface of the nose portion 8 of the pin 3 and the inner surface of the box 2 respectively have the seal portion 11 on a pin side and a seal portion 13 on a box side which are brought into metal-to-metal contact with each other in a radial direction at the time of making up the joint thus providing the structure which seals a fluid.

Aspects of the present invention are desirably applicable to a joint where a pin outer diameter is 114.3 mm or less. Although aspects of the present invention are applicable to the joint where the pin outer diameter which is a casing size described in API 5CT exceeds 114.3 mm, even if the joint is not designed so as to satisfy the formulae 1, 2 described later and to make Ls/Ln within a range of aspects the present invention, it is possible to realize both sealability against an external pressure and galling resistance. On the other hand, if the pin outer diameter is 114.3 mm or less, if the joint is designed so as to satisfy the formulae 1, 2 described later and to make Ls/Ln within the range of aspects of the present invention, it is possible to realize both sealability against an external pressure and galling resistance.

In FIG. 4, Ds1 is a diameter (inch) expressing position of an upper end (an end on an outer diameter side) of a shoulder contact surface, and Ds0 is a diameter (inch) expressing position of a lower end (an end on an inner diameter side) of the shoulder contact surface. An outer diameter D1 (inch) and an inner diameter D0 (inch) of a non-formed portion of the pin 3 are not indicated in FIG. 4. The shoulder contact surface indicates a surface formed by bringing the shoulder portion 12 into contact with the shoulder portion 14. The non-formed portion of the pin 3 is a region of the pin 3 where the male threaded portion 7 on a rear end side is not present when the shoulder portion 12 is set as a distal end side, and the non-formed portion of the pin 3 indicates a plain pipe region where an outer diameter and an inner diameter take fixed values in a tube axis direction.

θ is a taper angle (°) of the seal portion 13 of the box 2. Dn is a nose portion outer diameter (inch) of the pin 3, and is a diameter of the pin 3 at a connecting portion between the nose portion 8 and the male threaded portion 7. Dsp is an outer diameter (inch) at a seal point position of the pin 3. ΔD is difference (inch) between the nose portion outer diameter Dn of the pin 3 and the outer diameter Dsp at the seal point position (ΔD=Dn−Dsp). δ is a seal interference amount (inch). The seal interference amount δ is a seal portion overlapping margin per a diameter at the seal point position of the seal portion 20 which is an area formed by overlapping the seal portion 11 on a pin side and the seal portion 13 on a box side. Lt is a finish position index (inch) of a seal taper portion of the box 2 (expressed as a length in an axial direction from the distal end of the pin). Ls is an index (inch) of a seal point position (which is expressed by a length from the distal end of the pin in the axial direction). Ln is a length of a nose portion (inch).

The seal point is a position in an axial direction where an overlapping margin of the seal portions (e.g., the seal portion 11 and the seal portion 13) in the radial direction becomes maximum in a state where cross sectional drawings in the axial direction of both the pin 3 and the box 2 are made to overlap with each other such that the shoulder portions (e.g., the shoulder portion 12 and the shoulder portion 14) mate with each other.

To ensure sealability (particularly sealability against an external pressure), it is necessary to set the seal point at a position away from the tube end (the distal end of the pin). To be more specific, Ls/Ln obtained by dividing the seal point position index Ls by the nose portion length Ln may be designed to satisfy a relationship Ls/Ln=0.2 to 0.6. Ls/Ln is preferably set to 0.3 or more. Ls/Ln is preferably set to 0.5 or less. Further, the nose portion length Ln is preferably set to 0.2" (0.2 inches, 5.08 mm) or more.

When the nose portion length Ln is set excessively large, it is difficult to establish the formula 1 described later and hence, it is disadvantageous that sealablitiy is lowered along with plastic deformation of the nose portion. Accordingly, the nose portion length Ln is preferably set to 1" (25.4 mm) or less.

To suppress plastic deformation of the nose portion, it is desirable to increase a ratio of a cross-sectional area of the shoulder portion and hence. Therefore, a taper angle θ of the seal portion becomes inevitably small. "A ratio of a cross-sectional area of the shoulder portion" means a ratio of an area of an orthogonal projection image of a contact surface of the shoulder portion on a plane orthogonal to an axis to a cross-sectional area of the pin non-formed portion orthogonal to the axis, and is calculated by a mathematical expression on a left side of a following formula 1.

$$(Ds1^2 - Ds0^2)/(D1^2 - D0^2) \geq 0.30 \quad \text{(formula 1)}$$

where

Ds1: diameter (inch) expressing position of upper end of shoulder contact surface Ds0: diameter (inch) expressing position of lower end of shoulder contact surface D1: outer diameter (inch) of pin non-formed portion
D0: inner diameter (inch) of pin non-formed portion As shown in FIG. 4, the threaded joint is usually designed such that the threaded joint has "a connecting portion between the seal portion and the threaded portion" which is a portion for connecting the seal portion and the threaded portion to each other. As an extreme design, when a stepped portion of the connecting portion between the seal portion and the threaded portion becomes large, a contact occurs at the connecting portion between the seal portion and the threaded portion at an initial stage of a making up step so that a large face pressure is generated thus causing galling.

To solve such a problem, the inventors of the present invention have found out that galling caused by a contact to the connecting portion between the seal portion and the threaded portion at the time of making up can be prevented while suppressing the plastic deformation of the nose portion by designing such that the above-mentioned parameters satisfy the above-mentioned formula 1 and a formula 2 described below.

$$\tan \theta > (\Delta D + \delta)/\{2(Lt - Ls)\} \quad \text{(formula 2)}$$

wherein

θ: taper angle (°) of seal portion of box

ΔD: difference (ΔD=Dn−Dsp) (inch) between outer diameter Dn (inch) of nose portion of pin and outer diameter Dsp at seal point position δ: seal interference amount (overlapping margin of seal portions per diameter at seal point position) (inch)

Lt: index of finish position of seal taper portion of box (expressed by length from distal end of pin in axial direction) (inch)

Ls: index of position of seal point (expressed by length from distal end of pin in axial direction) (inch)

The mathematical expression on the left side of the formula 1 means "a ratio of cross-sectional area of the shoulder portion". By setting this value to 0.30 or more, the plastic deformation of the nose portion can be effectively suppressed. When the value of the left side of the formula 1 becomes excessively large, the formula 2 cannot be establish and hence, the realistic maximum value of the left side of the formula 1 becomes 0.5.

On the other hand, the mathematical expression of the formula 2 means a formula representing a condition for θ to satisfy in order for preventing the interference between the pin and the box at a finish position (position at which the position index becomes Lt) of the seal taper portion of the box.

Setting tan θ which is a tangent of the taper angle θ of the seal portion of the box larger than the value of the right side of the formula 2 prevents occurrence of galling due to a contact at the time of making up the seal portion and the threaded portion to the connecting portion. When θ becomes excessively large, the formula 1 cannot be established and hence, the realistic maximum value of θ becomes 15° (tan θ being 0.268 or less).

Numerical value ranges of parameters used in processes of inducing the formulae 1, 2 are as follows.

Ds1: 0.9" to 4.3", Ds0: 0.7" to 4.0", D1: 1.0" to 4.5", D0: 0.7" to 4.0"

θ: 3° to 15°, Dn: 1.0" to 4.4", Dsp: 1.0" to 4.4", δ: 0.004" to 0.040"

Lt: 0.1" to 0.9", Ls: 0.04" to 0.6", Ln: 0.2" to 1.0"

In the threaded portion used in the processes for inducing the formulae 1 and 2, the number of threads per axial length of 1" is 4 to 8, a numerical value range of the load flank angle α (see FIG. 2) is set to −10° to 5° (α: −10° to) 5°, a numerical value range of the thread gap 15 (see FIG. 2) is set to 0.025 mm to 0.200 mm, and a wall thickness of the pin non-formed portion (wall thickness of pin raw tube) is set to 0.1" to 1.0".

Advantageous effects of aspects of the present invention can be acquired by adopting the threaded joint at least within the numerical value ranges used in the processes of inducing the above-mentioned formulae 1 and 2 as an object to which aspects of the present invention are applied. Further, various steel grades described in API 5CT are included in oil well tubing to which the threaded joint according to the present invention is applicable.

EXAMPLES

In the example, a plurality of threaded joints for oil well tubing were prepared. The plurality thereof where each threaded joint is formed of: pins which are manufactured by applying thread cutting to tube end portions of a steel pipe for an oil well tubing made of carbon steel corresponding to L80 in API standard (yield strength: 90 ksi=620 MPa) and having an outer diameter of 3½" and a wall thickness of 0.254"; and a box which corresponds to these pins. The respective threaded joints for oil well tubing had data and standards shown in Table 1 and Table 2 when the respective threaded joints are made up at a low torque (3500 ft·lb). A sealability test in accordance with ISO13679: 2002 was applied to the respective threaded joints for oil well tubing. The number of threads of the pin was set to 5 per an axial length of 1", a load flank angle α was set to −5°, and a thread gap 15 was set to 0.10 mm.

A result of the test is shown in Table 3. As shown in Table 3, it is apparent that all present invention examples are determined to be non-defective in the sealability test in accordance with ISO13679: 2002 in all standards, can be made up without galling and plastic deformation can be suppressed so that sufficient sealability can be acquired.

TABLE 1

| No. | Ln (") | Lt (") | Ls (") | θ (°) | ΔD (") | δ (") | Ls/Ln (—) | Evaluation on formula 1 | Evaluation on formula 2 | Remarks |
|---|---|---|---|---|---|---|---|---|---|---|
| 1 | 0.700 | 0.570 | 0.280 | 4.0 | 0.010 | 0.017 | 0.40 | OK | OK | Present invention example 1 |
| 2 | 0.500 | 0.410 | 0.250 | 7.0 | 0.024 | 0.013 | 0.50 | OK | OK | Present invention example 2 |
| 3 | 0.300 | 0.230 | 0.100 | 10.0 | 0.032 | 0.012 | 0.33 | OK | OK | Present invention example 3 |
| 4 | 0.500 | 0.400 | 0.250 | 6.0 | 0.023 | 0.013 | 0.50 | OK | NG | Conventional example 1 |
| 5 | 0.300 | 0.220 | 0.120 | 10.0 | 0.017 | 0.012 | 0.40 | NG | OK | Conventional example 2 |
| 6 | 0.700 | 0.570 | 0.100 | 3.0 | 0.003 | 0.017 | 0.14 | OK | OK | Conventional example 3 |

TABLE 2

| No. | Dsp (") | Dn (") | Ds1 (") | Ds0 (") | D1 (") | D0 (") | Left side of formula 1 (—) | Left side of formula 2 (—) | Right side of formula 2 (—) |
|---|---|---|---|---|---|---|---|---|---|
| 1 | 4.196 | 4.207 | 4.057 | 3.536 | 4.500 | 3.380 | 0.45 | 0.070 | 0.048 |
| 2 | 3.299 | 3.323 | 3.140 | 2.828 | 3.500 | 2.750 | 0.40 | 0.123 | 0.116 |
| 3 | 2.238 | 2.270 | 2.139 | 2.018 | 2.375 | 1.995 | 0.30 | 0.176 | 0.169 |
| 4 | 3.299 | 3.322 | 3.159 | 2.828 | 3.500 | 2.750 | 0.42 | 0.105 | 0.120 |
| 5 | 2.240 | 2.256 | 2.118 | 2.018 | 2.375 | 1.995 | 0.25 | 0.176 | 0.140 |
| 6 | 4.187 | 4.190 | 4.091 | 3.536 | 4.500 | 3.380 | 0.48 | 0.052 | 0.021 |

TABLE 3

| No. | Evaluation on galling | Plastic deformation of shoulder portion | Sealability | Remarks |
|---|---|---|---|---|
| 1 | No problem | No problem | No problem | Present invention example 1 |
| 2 | No problem | No problem | No problem | Present invention example 2 |
| 3 | No problem | No problem | No problem | Present invention example 3 |
| 4 | Galling occurred in making up threaded joint | | | Conventional example 1 |
| 5 | No problem | Plastic deformation occurred in making up threaded joint | | Conventional example 2 |
| 6 | No problem | No problem | Leaked when external pressure is applied | Conventional example 3 |

REFERENCE SIGNS LIST

1: joint portion
2: box
3: pin
4: steel pipe for oil well tubing
5: female threaded portion (box side)
7: male threaded portion (pin side)
8: nose portion (pin nose)
9: load flank surface of threaded portion
10: stabbing flank surface of threaded portion
11, 13: seal portion (metal touch seal portion)
12: shoulder portion (pin side)
14: shoulder portion (box side)
15: thread gap
20: seal portion (area which is formed by overlapping seal portions 11 and 13)
100: threaded joint

The invention claimed is:

1. A threaded joint for an oil well tubing comprising:
a pin having a nose portion on a distal end of a male threaded portion; and
a box having a female threaded portion which engages with the male threaded portion of the pin by fitting engagement and portions opposedly facing the nose portion, wherein
a shoulder portion positioned on a distal end of the nose portion of the pin is brought into contact with a shoulder portion of the box which opposedly faces the shoulder portion of the pin in an axial direction,
an outer surface of the nose portion of the pin is formed of a projecting curved surface, and an inner surface of the box which opposedly faces the outer surface of the nose portion is formed of a tapered surface having an inclination angle θ with respect to the axial direction,
both the outer surface of the nose portion of the pin and the inner surface of the box are configured to be brought into metal-to-metal contact with each other in a radial direction at the time of making up the joint thus forming a structure which seals a fluid,
a seal point is defined as a position in the axial direction where an overlapping margin of seal portions of both the pin and the box in the radial direction becomes maximum in a state where cross sectional views in the axial direction of both the pin and the box are made to overlap with each other such that the shoulder portions mate with each other, and
formula 1 and formula 2 are satisfied, and Ls/Ln is set to 0.2 to 0.6:

$$(Ds1^2 - Ds0^2)/(D1^2 - D0^2) \geq 0.30 \quad \text{(formula 1)}$$

$$\tan\theta > (\Delta D + \delta)/\{2(Lt - Ls)\} \quad \text{(formula 2)}$$

where

Ds1: diameter (inch) expressing position of upper end of a shoulder contact surface;

Ds0: diameter (inch) expressing position of lower end of the shoulder contact surface;

D1: outer diameter (inch) of a pin non-formed portion;

D0: inner diameter (inch) of the pin non-formed portion;

θ: taper angle (°) of the seal portion of the box;

ΔD: difference (ΔD=Dn−Dsp) (inch) between outer diameter Dn (inch) of connecting portion of the nose portion with the threaded portion of the pin and outer diameter Dsp (inch) at the position of the seal point;

δ: seal interference amount (overlapping margin of the seal portions per diameter at the position of the seal point) (inch);

Lt: index (inch) of finish position of a seal taper portion of the box (expressed by length from a distal end of the pin in axial direction);

Ls: index (inch) of a seal point position (which is expressed by length from the distal end of the pin in axial direction); and Ln: length (inch) of the nose portion.

* * * * *